United States Patent [19]

Kodama

[11] 4,199,991
[45] Apr. 29, 1980

[54] ISOLATION DIAPHRAGM ASSEMBLY FOR PRESSURE TRANSDUCERS AND METHOD OF MANUFACTURE

[75] Inventor: Roy K. Kodama, Thousand Oaks, Calif.

[73] Assignee: Gould Inc., Rolling Meadows, Ill.

[21] Appl. No.: 903,853

[22] Filed: May 8, 1978

[51] Int. Cl.² ............................................. G01L 7/08
[52] U.S. Cl. ..................... 73/706; 29/454; 73/715; 228/135
[58] Field of Search .................. 73/706, 715; 29/454; 228/135

[56] References Cited

U.S. PATENT DOCUMENTS

| | | | |
|---|---|---|---|
| 1,763,354 | 6/1930 | Ileman | 73/715 |
| 4,046,010 | 9/1977 | Akeley | 73/706 |

Primary Examiner—Donald O. Woodiel
Attorney, Agent, or Firm—Russell E. Baumann; Charles E. Snee, III

[57] ABSTRACT

An improved isolation diaphragm assembly for use in pressure transducers includes an open plenum containing an inert transmission fluid such as silicone oil. The plenum opening is bridged by a corrugated, circular diaphragm which has been tack welded at spaced locations on its periphery and then deformed into an underlying circular groove in the transducer housing, thereby providing a smooth sealing surface between the tack welds and the deformed portion. A domed cover having an O-ring seal contacting the smooth sealing surface is attached to the transducer housing so that a fluid whose pressure is to be measured may be introduced on the other side of the diaphragm from the inert transmission fluid. A method of manufacture is also disclosed.

6 Claims, 2 Drawing Figures

ISOLATION DIAPHRAGM ASSEMBLY FOR PRESSURE TRANSDUCERS AND METHOD OF MANUFACTURE

CROSS-REFERENCE TO RELATED APPLICATION

This application discloses an improvement on the invention disclosed in Ser. No. 759,890, Strain Gage Transducer Construction, filed Jan. 17, 1977 in the name of Richard Schaberg, assigned to the assignee of this application and now abandoned.

BACKGROUND OF THE INVENTION

In the pressure measuring technology, instances frequently arise in which it is necessary to measure the pressure of hot, caustic, corrosive or otherwise potentially harmful fluids which could damage vital parts of the pressure transducer upon contact. It is known to combat this problem by interposing between the harmful medium and the transducer an inert fluid such as silicone oil which, in turn, is isolated from the harmful medium by an isolation bellows, diaphragm, piston or the like. The harmful medium bears against the isolation diaphragm, thereby pressurizing the inert fluid to which the transducer then responds.

The previously mentioned application of Schaberg discloses a unique isolation diaphragm and domed cover assembly designed to prevent leakage between the harmful medium and the inert fluid. While the Schaberg invention has achieved a measure of success, it has been found that due to the assembly technique used, the diaphragm may become deformed in the area where the O-ring seal of the dome cover is intended to seat, thereby allowing leakage of the harmful medium. The present invention provides a unique solution to the problems experienced with the Schaberg device.

OBJECTS OF THE INVENTION

An object of the invention is to provide an isolation diaphragm and domed cover or cap construction for a pressure transducer, which prevents leakage of the medium to be tested and the inert transmission fluid.

A further object of the invention is to provide such a construction which is simple to manufacture and maintain.

Yet another object of the invention is to provide such a construction in which only the cap and isolation diaphragm need be made of corrosion resistant material.

These objects are given only by way of example; thus, other desirable advantages and objectives inherently achieved by the disclosed structure may occur to those skilled in the art. Nonetheless, the scope of the invention is to be limited only by the appended claims.

SUMMARY OF THE INVENTION

The above objects and other advantages are achieved by the invention in which a flexible isolation element having a peripheral flange is tack welded about its periphery to a sealing surface of the transducer housing. After welding, the peripheral flange is deformed into at least one annular groove provided in the housing to provide a further sealing surface on the isolation element, between the tack welds and the annular groove. A seal in the transducer cap mates with this further sealing surface to provide an adequate seal to prevent leakage of caustic or harmful media whose pressure is to be measured. The peripheral flange is stretched between the tack welds and the annular groove during deformation, thus preventing radial movement of the diaphragm and leakage of the pressure transmitting fluid.

DETAILED DESCRIPTION OF THE PREFERRED EMBODIMENT

Figure 1:
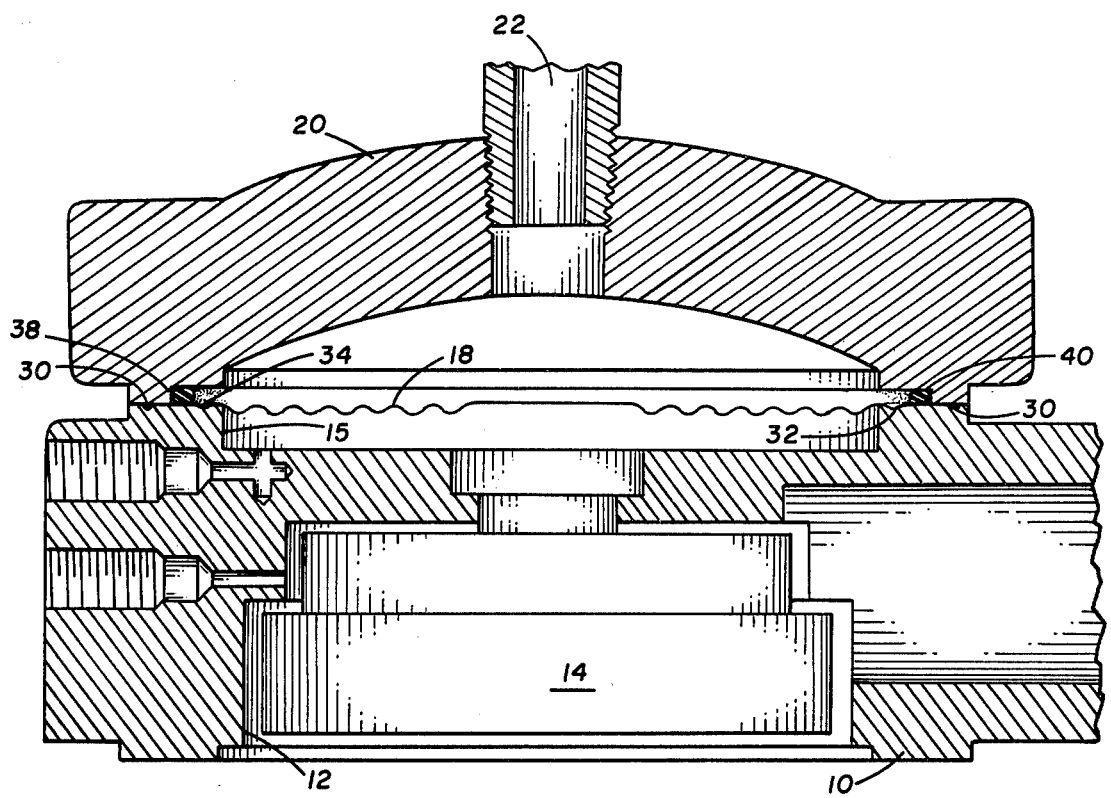
FIG. 1 shows an elevational, partially sectional view through a pressure transducer embodying the present invention.

The following is a description of a preferred embodiment of the invention, reference being made to the drawing in which like reference numerals identify like elements of structure in the two Figures.

FIG. 1 shows an elevational partial section of the invention. A transducer housing 10 includes a stepped central bore 12 within which a pressure transducing element 14, of known design, is retained by means not shown. In use, housing 10 is filled with a pressure transmitting medium such as silicone oil (not shown) which directly contacts and actuates transducing element 14. The upper end 15 of stepped bore 12 is closed by a thin, resilient diaphragm 18 which is in pressure transmitting relationship on one side thereof with the pressure transmitting medium. The other side of diaphragm 18 communicates with the underside of a domed cover or cap 20 having a pressure inlet 22. Cap 20 and diaphragm 18 are preferably made from a corrosion resistant material such as stainless steel or the like; whereas, housing 10 may be made of a less corrosion resistant material.

Figure 2:
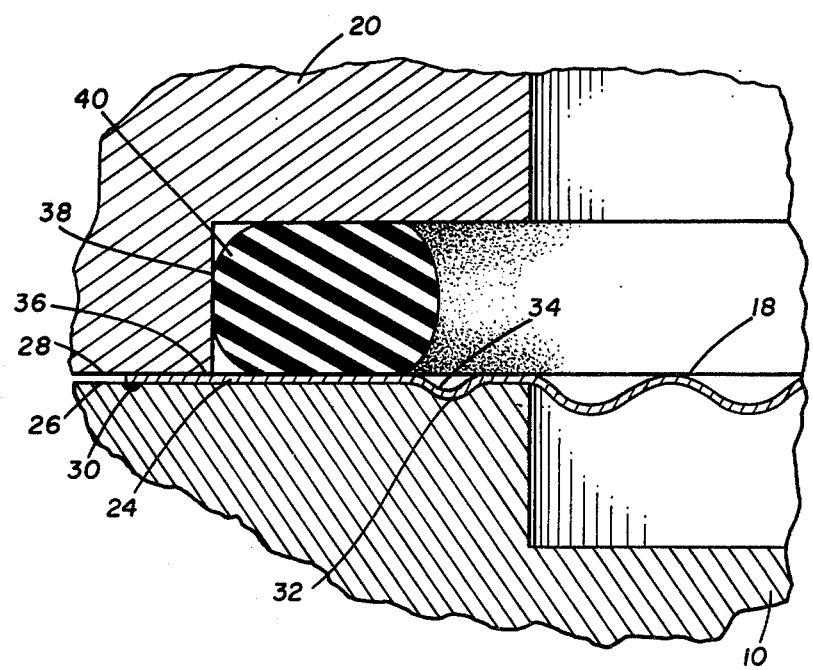
FIG. 2 shows an enlarged view of a portion of FIG. 1, indicating the details of the assembly of the transducer housing, isolation diaphragm, domed cover and O-ring seal.

Diaphragm 18 comprises a flat peripheral flange 24, most clearly seen in FIG. 2, which is retained between an annular sealing surface 26 on housing 10 and a similar sealing surface 28 on cap 20. Though a diaphragm is preferred, those skilled in the art will appreciate that a resilient bellows having an appropriate peripheral flange may also be used as the flexible isolation element, without departing from the invention. Prior to assembly of the invention, peripheral flange 24 is preferably flat. It is seated on sealing surface 26 and then tack welded at equally spaced locations around its periphery, as indicated at 30. Then, peripheral flange 24 is deformed, either hydraulically or mechanically, into at least one annular groove 32 formed in sealing surface 36, thereby forming an annular groove 34 in peripheral flange 24. During the formation of groove 34, flange 24 is stretched radially inwardly from tack welds 30 to provide a smooth sealing surface 36 for mating with cap 20. Groove 34 prevents radial movement of diaphragm 20 and prevents leakage of the pressure transmitting medium.

A counterbore 38 is provided in cap 20 which receives and retains an O-ring 40 or the like of appropriate diameter to contact sealing surface 36 between tack welds 30 and annular groove 34. When cap 20 is pressed into engagement with sealing surface 36 by conventional means not shown, O-ring 40 deforms as illustrated to provide a seal to prevent the harmful or corrosive test liquid beneath cap 20 from leaking out of the transducer. Cap 20 may be removed from the transducer without requiring recalibration because tack welds 30 and grooves 32,34 isolate the active portion of diaphragm 18 from any deleterious effects of cap installation and removal.

Having described my invention in sufficient detail to enable those skilled in the art to make and use it, I claim:

1. In a pressure transducer of the type comprising: a hollow transducer housing, a pressure transmitting liquid within said housing, a flexible isolation element secured to said housing with one side thereof in pressure transmitting relation to said pressure transmitting liquid and a cover secured to said housing for admitting a test fluid to the other side of said flexible isolation element, the improvement comprising:

a peripheral flange on said flexible isolation element;

a first annular sealing surface on said housing, said sealing surface having at least one annular groove formed therein and being sized to accommodate at least said peripheral flange;

a plurality of spaced tack welds securing said peripheral flange to said annular sealing surface;

means formed in said peripheral flange subsequent to said plurality of spaced tack welds for extending into said annular groove to provide a second annular sealing surface on said peripheral flange between said spaced tack welds and said annular groove, thereby to prevent radial movement of said flexible isolation diaphragm and to minimize leakage of said pressure transmitting fluid; and seal means located in said cover for contacting said peripheral flange on said second annular sealing surface.

2. The improvement of claim 1, wherein said flexible isolation element is a thin, resilient diaphragm.

3. The improvement of claim 1, wherein said seal means is an O-ring compressed between said cover and said peripheral flange.

4. A method of assembling a flexible isolation element having a peripheral flange to a transducer housing having an annular sealing surface with at least one annular groove formed therein; comprising the steps of:

placing said peripheral flange in contact with said annular sealing surface;

tack welding said peripheral flange to said annular surface at spaced locations around said flange; and deforming said peripheral flange into said at least one annular groove, whereby said peripheral flange is stretched between said tack weld locations and said annular groove, to provide an effective sealing surface on the side of said peripheral flange opposite said annular groove.

5. The improvement of claim 1, wherein said tack welds are at the peripheral edge of said flange.

6. The method of claim 4, wherein said tack welding is done at the peripheral edge of said flange.

* * * * *